(12) United States Patent
Lee

(10) Patent No.: US 7,904,574 B1
(45) Date of Patent: Mar. 8, 2011

(54) MANAGING LOCALLY STORED WEB-BASED DATABASE DATA

(76) Inventor: Bryant Christopher Lee, Cambridge, MA (US)

( * ) Notice: Subject to any disclaimer, the term of this patent is extended or adjusted under 35 U.S.C. 154(b) by 0 days.

(21) Appl. No.: 12/889,792

(22) Filed: Sep. 24, 2010

(51) Int. Cl.
*G06F 15/16* (2006.01)
*G06F 7/00* (2006.01)
*G06F 17/00* (2006.01)

(52) U.S. Cl. .......... 709/229; 709/219; 707/610; 707/636

(58) Field of Classification Search .......... 709/219, 709/229; 707/610, 636
See application file for complete search history.

(56) References Cited

U.S. PATENT DOCUMENTS

| | | | |
|---|---|---|---|
| 6,442,549 B1 * | 8/2002 | Schneider | 1/1 |
| 6,741,997 B1 * | 5/2004 | Liu et al. | 1/1 |
| 6,877,137 B1 * | 4/2005 | Rivette et al. | 715/230 |
| 7,054,900 B1 | 5/2006 | Goldston | |
| 7,370,120 B2 * | 5/2008 | Kirsch et al. | 709/246 |
| 7,778,987 B2 * | 8/2010 | Hawkins | 707/705 |
| 2010/0207942 A1 | 8/2010 | Zhao | |

OTHER PUBLICATIONS

Hellerstein and Stonebraker, "Anatomy of a Database System", Readings in Database Systems, 2005, pp. 42-83, MIT Press.

* cited by examiner

*Primary Examiner* — Ranodhi N Serrao

(57) ABSTRACT

The present invention extends to methods, systems, and computer program products for locally storing Web-based database data in a local relational database at a computer system and for managing and modifying the web-based database data from a web server. Embodiments of the present invention permit Web-based database data to be locally stored at a computer system to increase the efficiency of rendering the Web-based database data within a Web browser at the computer system. Web-based database data can be sandboxed per domain to mitigate (and possibly eliminate) the exposure of the Web-based database data to malicious computer systems. The local relational database may be managed and modified by a statement processor according to database statements generated by a statement generator on a web server.

6 Claims, 3 Drawing Sheets

MANAGING LOCALLY STORED WEB-BASED DATABASE DATA

CROSS-REFERENCE TO RELATED APPLICATIONS

Not Applicable.

BACKGROUND

Users surf the World Wide Web by using web browsers on their personal computers to access web pages and other data that are stored on remote web servers, where the personal computers are connected to the remote web servers via the Internet. The Internet is a global system of interconnected computer networks. The World Wide Web comprises a set of inter-linked hypertext documents called web pages.

Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

Most, if not all Web browsers, cache portions of Web-based content in a common storage location (the browser cache) so that subsequent renderings of a Web page can be presented more efficiently. For example, when a Web browser receives a Web page from a Web server, the Web browser can locally cache portions of the content included in the Web page. Thus, if the Web browser is subsequently directed to the same Web page, the Web browser can check the common storage location for cached portions of content and any cached portions of content can be combined with other content received via the network to construct the Web page. Accordingly, using locally cached content potentially reduces the amount of data that is transferred over a network in order to display content from the Web server. As a result, Web pages can be rendered more quickly improving the user experience.

However, typically, even if only a portion of a Web page changes the entire page is reloaded over the network for display on a Web browser. For example it may be that a Web browser accesses a Web page, downloads content of the Web page via network communication, and caches content from the Web page. If the content of the Web page subsequently changes, the Web browser can be required to re-download the entire Web page even if only small portions of the Web page have changed.

Thus more recently, some Web browsers have implemented partial page updates to better utilize cached content. Content is re-downloaded when an applicable portion of a Web page changes. However, a Web browser is not necessarily required to re-download all the content of Web page in response to a change to a portion of the Web page. For example, when a single image in a Web page changes, the Web browser can detect the change and re-download the single image without having to re-download other cached content that has not changed.

Some Web-based applications also permit Web browsers to interact with data from a database (e.g., an SQL database). A Web server receives a request from a Web browser, accesses an appropriate portion of database data, and returns the database data to the Web browser. Depending on the configuration of the Web based application, a user may also be able to change portions of database data through the Web browser. For example, a user may be able to create and modify database records through the Web browser. In some environments, a user is able to implement SQL operations (CREATE TABLE, SELECT, INSET, UPDATE, DELETE, etc.) through a Web browser. Thus, a Web browser essentially provides a user-interface for manipulating database data over a network (e.g., the Internet).

U.S. Pat. No. 7,778,987 ("Hawkins") discloses a method for caching database data in a web browser. Hawkins discloses that the computer system receives a portion of the database from the Web server. The computer system locally stores the received database portion at the computer system. The locally stored database portion is locally accessible to the Web browser such that data from the locally stored database portion can be locally provided to the Web browser without the data being included in network based communication. The computer system retains an indication that the database portion was received from the specified domain to prevent script code from Web servers in other domains from accessing the database portion.

Hawkins discloses that a computer system renders tabular database data within the Web browser. The computer system sends a Web based request to a Web server in a specified domain indicated by a specified domain name. The Web based request is for accessing a Web page that includes a portion of a database stored in a database accessible to the Web server.

Hawkins discloses that the computer system receives a request from the Web server for access to a locally stored database portion that is stored locally at the computer system. The computer system accesses a stored domain name indicative of a domain that previously sent the locally stored database portion to the computer system. The computer system compares the specified domain name to the stored domain name. The computer system determines that the specified domain name and the stored domain name are sufficiently similar to allow responses from the Web server to include database data from the locally stored database portion. The computer system includes data from the locally stored database portion in a Web based response to the Web based request based on the determination. The computer system presents the Web based response including the data from the locally stored database portion at the Web browser.

However, current methods do not allow for the management or modification, by the web server, of the data in the database portion at the computer system. It may be desirable for the web server to be able to manage or modify data in the database portion on the computer system. No current methods allow for the web server to manage or modify data in the database portion on the computer system. One problem is that the web server is remote from the computer system. A second problem is that the web server must communicate the desired management or modification to the computer system. A third problem is that the web server must coordinate its management or modification with the computer system. A fourth problem is how to specify the management or modification that is requested by the web server. Solving these problems enables improvements in the design, functionality, and efficiency of web pages and other content served from web servers.

BRIEF SUMMARY

The present invention extends to methods, systems, and computer program products for locally storing Web-based database data in a local relational database at a computer system and for managing and modifying the web-based database data from a web server. In some embodiments, a computer system caches tabular database for subsequent Web browser access. The computer system sends a Web based request to a Web server in a specified domain. The Web based request requests access to a Web page that includes a portion of a database that is stored in a database accessible to the Web server.

The computer system receives a portion of the database from the Web server. The computer system locally stores the received database portion in a local relational database at the computer system. The locally stored database portion is locally accessible to the Web browser such that data from the locally stored database portion can be locally provided to the Web browser without the data being included in network based communication. The computer system retains an indication that the database portion was received from the specified domain to prevent script code from Web servers in other domains from accessing the database portion.

In other embodiments, a computer system renders tabular database data within the Web browser. The computer system sends a Web based request to a Web server in a specified domain indicated by a specified domain name. The Web based request is for accessing a Web page that includes a portion of a database stored in a database accessible to the Web server.

The computer system receives a request from the Web server for access to a locally stored database portion that is stored locally at the computer system. The computer system accesses a stored domain name indicative of a domain that previously sent the locally stored database portion to the computer system. The computer system compares the specified domain name to the stored domain name. The computer system determines that the specified domain name and the stored domain name are sufficiently similar to allow responses from the Web server to include database data from the locally stored database portion. The computer system includes data from the locally stored database portion in a Web based response to the Web based request based on the determination. The computer system presents the Web based response including the data from the locally stored database portion at the Web browser.

The web server manages or modifies the local relational database at the computer system that contains the database portion. The web server may include a statement generator. The statement generator may be part of the web server, part of an application, or a stand-alone application. The statement generator generates a database statement configured to manage or modify the local relational database by reading data from a file or by executing computer code. The database statement is contained in a web page on the web server. The web server sends the web page to the web browser on the computer system. The computer system may read the web page including the database statement. A statement processor on the computer system may process the database statement. The statement processor may parse the database statement, rewrite the database statement, optimize the database statement, or execute the database statement, or all those actions or any combination of those actions. The database statement may be executed on the local relational database causing management or modification of the relational database.

The computer system may also manage or modify the local relational database apart from or together with the web server.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
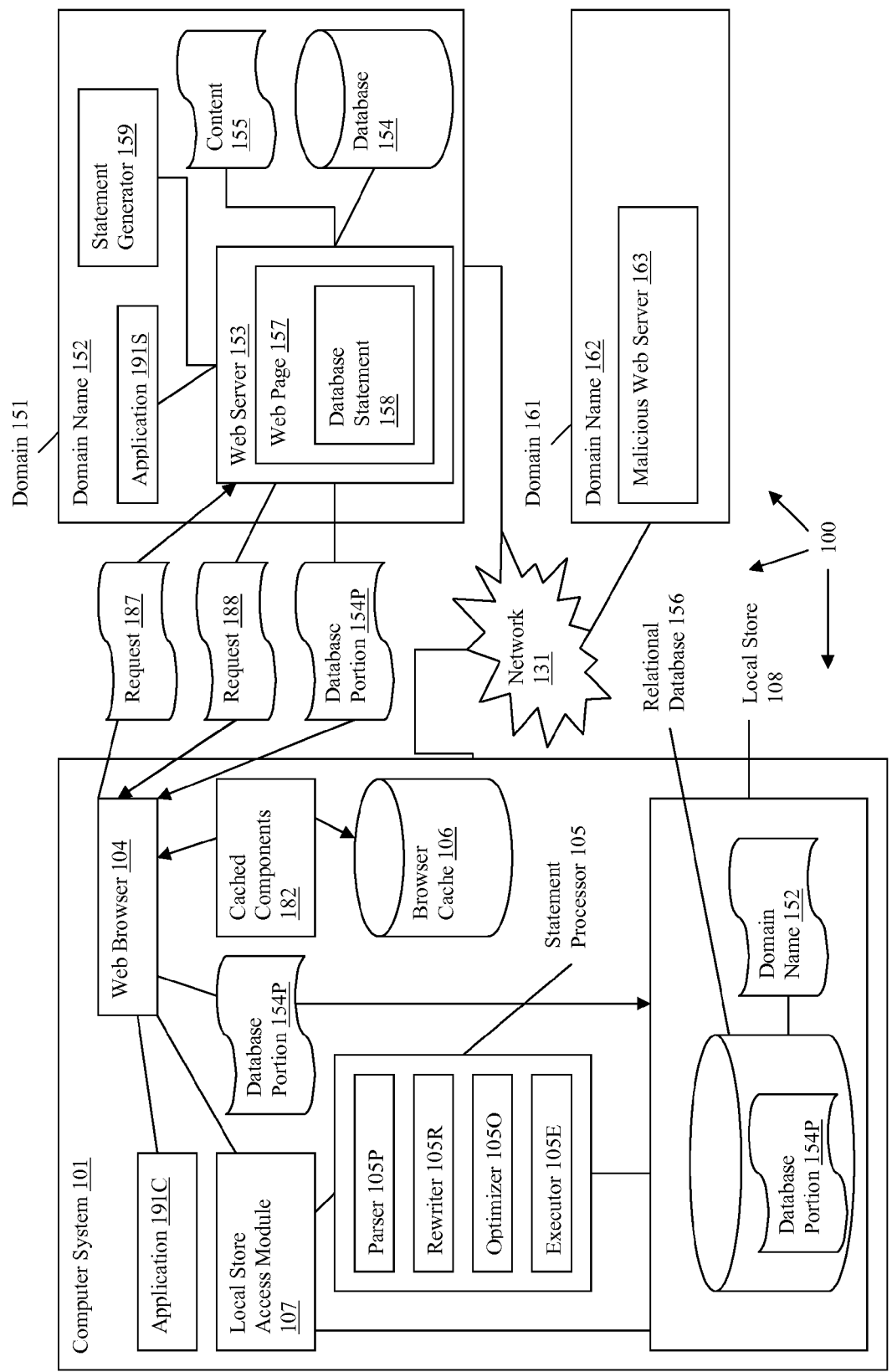
FIG. 1 illustrates an example computer architecture that facilitates locally storing Web-based database data.

The present invention extends to methods, systems, and computer program products for locally storing Web-based database data in a local relational database at a computer system and for managing and modifying the web-based database data from a web server. In some embodiments, a computer system caches tabular database for subsequent Web browser access. The computer system sends a Web based request to a Web server in a specified domain. The Web based request requests access to a Web page that includes a portion of a database that is stored in a database accessible to the Web server.

The computer system receives a portion of the database from the Web server. The computer system locally stores the received database portion in a local relational database at the computer system. The locally stored database portion is locally accessible to the Web browser such that data from the locally stored database portion can be locally provided to the Web browser without the data being included in network based communication. The computer system retains an indication that the database portion was received from the specified domain to prevent script code from Web servers in other domains from accessing the database portion.

In other embodiments, a computer system renders tabular database data within the Web browser. The computer system sends a Web based request to a Web server in a specified domain indicated by a specified domain name. The Web based request is for accessing a Web page that includes a portion of a database stored in a database accessible to the Web server.

The computer system receives a request from script code from the Web server for access to a locally stored database portion that is stored locally at the computer system. The computer system accesses a stored domain name indicative of a domain that previously sent the locally stored database portion to the computer system. The computer system compares the specified domain name to the stored domain name. The computer system determines that the specified domain name and the stored domain name are sufficiently similar to allow responses from the Web server to include database data from the locally stored database portion. The computer system includes data from the locally stored database portion in a Web based response to the Web based request based on the determination. The computer system presents the Web based response including the data from the locally stored database portion at the Web browser.

The web server manages or modifies the local relational database at the computer system that contains the database portion. The web server may include a statement generator. The statement generator may be part of the web server, part of an application, or a stand-alone application. The statement generator generates a database statement configured to manage or modify the local relational database by reading data from a file or by executing computer code. The database statement is contained in a web page on the web server. The web server sends the web page to the web browser on the computer system. The computer system may read the web page including the database statement. A statement processor on the computer system may process the database statement. The statement processor may parse the database statement, rewrite the database statement, optimize the database statement, or execute the database statement, or all those actions or any combination of those actions. The database statement may be executed on the local relational database causing management or modification of the relational database.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates locally storing Web-based database data. Computer architecture 100 includes computer system 101, network 131, and domain 151. Depicted in computer architecture 100 are various components including application 191C, Web browser 104, application 191S, and Web server 153. Each of the various components can be connected to network 131, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, components can exchange Simple Object Access Protocol ("SOAP") envelopes containing Web service related data. In some embodiments, application 191C and application 191S are different portions of a distributed application, such as, for example, a Web services application.

Web browser 104 can be configured to request Web-based content from domains, such as, for example, domain 151, accessible via network 131. Web-based content can include text data, image data, audio/video data, etc. One or more Web-based applications, such as, for example, application 191C, can be configured to run within Web browser 104. A Web-based application can be a script and/or other computer-executable instructions. Web-based applications can request other types of data, such as, for example, database data, from domains accessible via network 131.

Domain 151 can be identified by domain name 152, such as, for example, domain name service ("DNS") name that is resolvable to an IP address. Domain name 152 can be entered to a Web browser (potentially along with other identifying information for a specified application within the domain 151) to direct a browser to request content from Web server 153. A domain name along with other identifying information can be included in a Uniform Resource Locator ("URL") entered into a Web browser. Depending on a type of request and/or a received URL, Web server 153 can access content from content 155 and/or initiate a Web-based application, such as, for example, application 191S. Application 191S can request data from other locations in domain 151, such as, for example, from database 154 (e.g., a SQL or other relational database). Web server 153 can include content from 155 and/or data from database 154 in a response to a Web browser request.

Browser cache 106 is configured to cache components included in Web-based content received from domains, including domain 151. The cached components can subsequently be made available to fulfill Web-based requests sent from Web browser 104. For example, cached components 182 can be portions of content 155 accessed directly from browser cache 106 (without the need for transporting cached components 182 via network 131) and rendered within Web browser 104.

When a Web server is attempting to respond to a request from Web browser 104, script code from the Web server can access browser cache 106 to search for locally cached components. When cached components are identified, the Web server can access the components and include the components in a response that is to be rendered within Web browser 104. Thus, browser cache 106 is generally accessible to any Web server communicating with Web browser 104. Accordingly, a Web server in one domain can access cached components in browser cache 106 that were cached for a Web server in a different domain.

On the other hand, local store access module 107 manages access to local store 108. Local store 108 is configured to store database data received in response to Web-based requests. Database data stored in local store 108 can be accessed by Web browser 104 (without the need for transporting the database data via network 131) and rendered in a Web-based application within Web browser 104. Database data can be stored in local store 108 along with an indication of the domain that sent the database data to Web browser 104.

Local store access module 107 can filter requests from script code from Web servers to access database data stored in local store 108 such that one domain is prevented from accessing another domains database data. Thus, although database data is stored in local store 108, the database data is not generally accessible to fulfill requests for any domain (in contrast to components stored in browser cache 106 which are generally accessible to Web servers from any domain).

Figure 2:
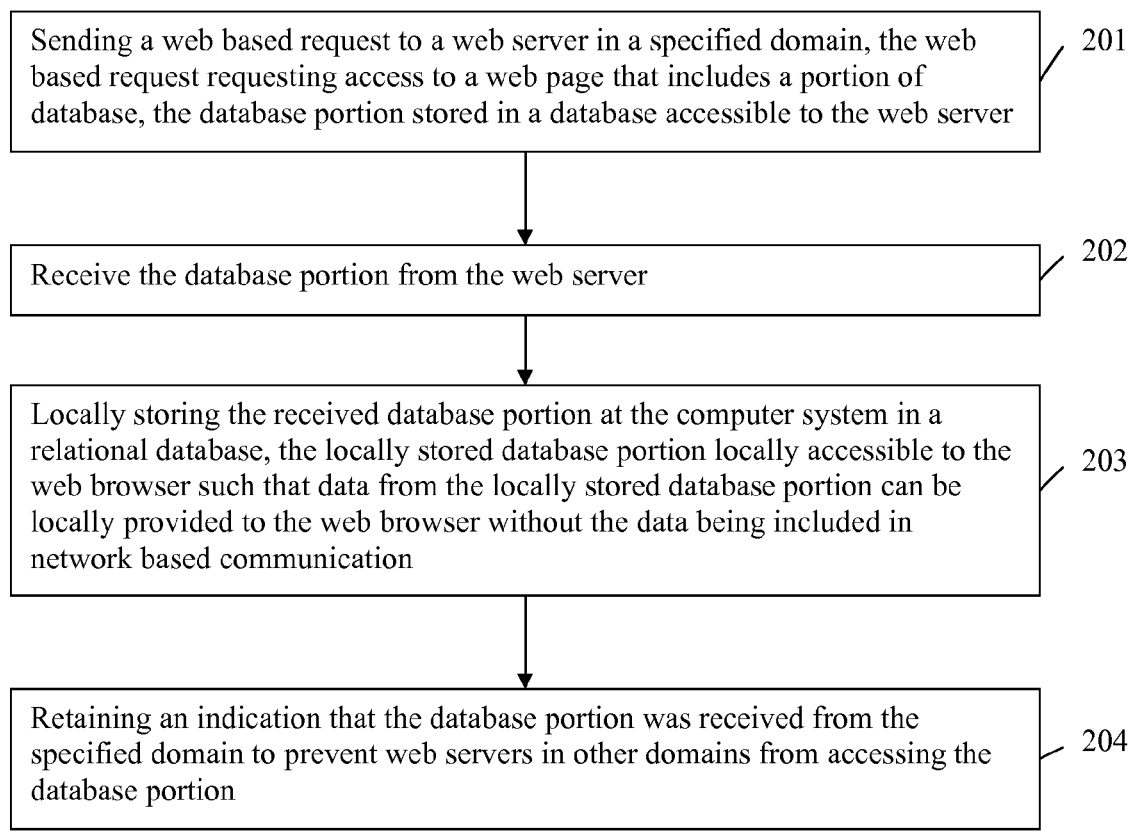
FIG. 2 illustrates a flow chart of an example method for storing a database portion in a relational database at a computer system for subsequent Web browser access.

FIG. 2 illustrates a flow chart of an example method 200 for storing a database portion in a local relational database 156 at a computer system for subsequent Web browser access. The method 200 will be described with respect to the components of computer architecture 100 depicted in FIG. 1.

Method 200 includes an act of sending a Web based request to a Web server in a specified domain, the Web based request requesting access to a Web page that includes a portion of database data, the database portion stored in a database accessible to the Web server (e.g., through script code execution) (act 201). For example, script code of application 191C (running within browser 104) can send request 187 to Web server 153 in domain 151. Request 187 can be a request for access to a Web page that includes a portion of database 154.

Web server 153 can receive request 187 and route at least a portion of request 187 to application 191S. Application 191S can access database portion 154P from database 154 in response to receiving the request. When appropriate, Web server 153 can combine any database data accessed from database portion 154P with other content from content 155. From database portion 154P and potentially other content, Web server 153 can formulate Web page 157. Web server 153 can send Web page 157 to Web browser 104.

Web browser 104 can receive Web page 157. Web browser 104 can render some portions of content and forward any database data to application 191C. Application 191C can process and render the database data.

In response to request 187, Web server 153 can also send database portion 154P to Web browser 104.

Method 200 includes an act of receiving the database portion from the Web server (act 202). For example, Web browser 104 can receive database portion 154P included in Web page 157. Alternately, Web browser 104 can receive database portion 154P that was sent separately to Web browser 104 in response to request 187.

Method 200 includes an act of locally storing the received database portion in a local relational database 156 at the computer system, the locally stored database portion being locally accessible to the Web browser such that data from the locally stored database portion can be locally provided to the Web browser without the data being included in network based communication (act 203). For example, Web browser 104 can store database portion 154P in local store 108. Accordingly, database portion 154P is locally accessible to Web browser 104 such that the locally stored database portion 154P can be provided to Web browser 104 without transferring database portion 154P via network 131.

Method 200 includes an act of retaining an indication that the database portion was received from the specified domain to prevent Web servers in other domains from accessing (e.g., through script code execution) the database portion (act 204). For example, domain name 152 can be stored along with database portion 154P in local store 108 to indicate that database portion 154P was received from domain 151. Local store access module 107 can compare the domain name associated with subsequent requests for database portion 154P to domain name 152 to determine if requests to access database portion 154P are granted.

FIG. 1 further depicts domain 161. Domain 161 includes malicious Web server 163. Malicious Web server 163 can be configured to attempt to access cached components of other Web servers cached in browser cache 106 and to attempt to access database data from other domains stored in local store 108.

Figure 3:
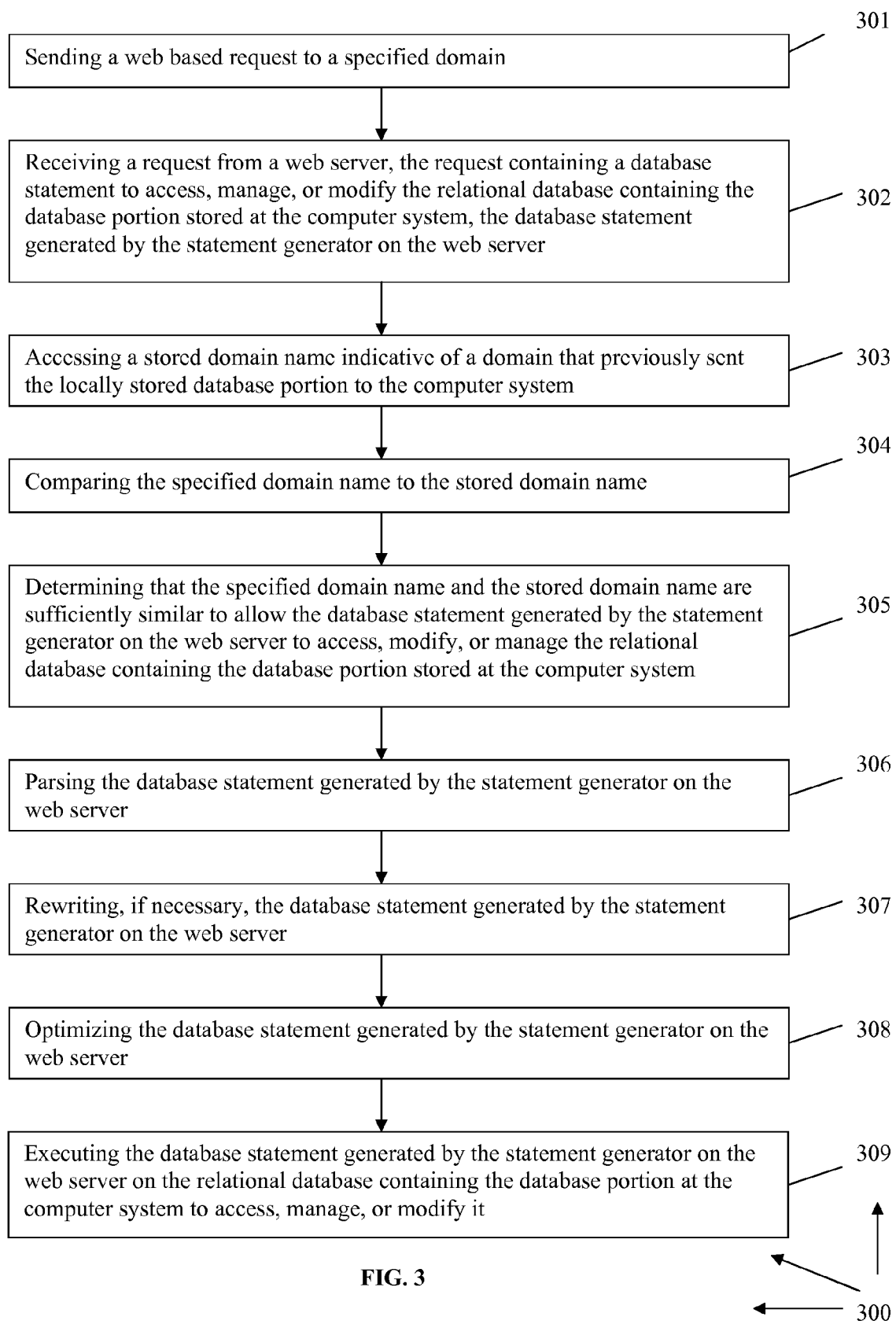
FIG. 3 illustrates a flow chart of an example method for managing or modifying by a web server of a relational database at a computer system.

FIG. 3 illustrates a flow chart of an example method 300 for managing and modifying the local relational database 156 containing the database portion 154P. The method 300 will be described with respect to the components of computer architecture 100 depicted in FIG. 1.

Method 300 includes an act of sending a Web based request to a Web server in a specified domain indicated by a specified domain name, the Web based request for accessing a Web page that includes a portion of a database, the database portion stored in a database accessible to the Web server (act 301). For example, Web browser 104 can send request 187 to Web server 153 in domain 151. Request 187 can be associated with a URL that includes domain name 152. Request 187 can be a request to access a Web page that includes database portion 154P from database 154.

In response to request 187, Web server 153 can send request 188 back to Web browser 104. Request 188 can be a request to manage or modify the local relational database 156 containing the database portion 154P stored in local store 108 (act 302). The request includes a database statement 158 contained in a web page 157. The database statement 158 is generated by statement generator 159 by reading data from a file or executing computer code. The database statement may be expressed in SQL or another computer programming language. The statement generator 159 may be part of the web server, part of an application, or a stand-alone application. In one embodiment, the statement generator 159 may generate the database statement 158 by reading an HTML file from disk, wherein the HTML file includes an expression of a database statement 158. In one embodiment, the statement generator 159 may generate the database statement 158 by reading a text, ascii, or binary file from disk, wherein the text, ascii, or binary file includes an expression of a database statement 158. In one embodiment, the statement generator 159 may generate the database statement 158 by reading data out of a database 154. In one embodiment, the statement generator may generate the database statement 158 by reading content 155. In one embodiment, the statement generator may generate the database statement 158 by executing code in application 191S. The database statement 158 is configured for management or modification of the local relational database 156. The database statement 158 may be configured to update, insert, or delete data items. The database statement 158 may be configured to create or delete tables or schemas. The computer system 101 receives the request from the web server 153 (act 302).

Method 300 includes an act of accessing a stored domain name indicative of a domain that previously sent the locally stored database portion to the computer system (act 303). For example, local store access module 107 can access domain name 152 indicative of a Web server in domain 151 having previously sent database portion 154P to Web browser 104.

Method 300 includes an act of comparing the specified domain name to the stored domain name (act 304). For example, local store access module can compare domain name 152 (stored in local store 108) to domain name 152 (associated with request 187). Method 300 includes an act determining that the specified domain name and the stored domain name are sufficiently similar to allow the Web server to manage or modify the local relational database 156 containing the locally stored database portion (act 305). For example, local store access module 107 can determine that domain 152 (stored in local store 108) is identical to domain name 152 (associated with request 187). However, specified rules indicating lesser degrees of similarity can be used to determine if a specified domain name and a stored domain name are sufficiently similar.

Method 300 includes an act of allowing management or modification of the local relational database 156 containing the locally stored database portion according to the database statement 158 contained in the web page 157. The database statement 158 may be processed by the statement processor 105 on the computer system. The processing by the statement processor 105 may include parsing the database statement 158 by the parser 105P (act 306). The processing by the statement processor 105 may include rewriting the database statement 158, if necessary, by the rewriter 105R (act 307). The processing by the statement processor 105 may include optimizing the database statement 158 by the optimizer 1050 (act 308). The processing by the statement processor 105 may include executing the database statement 158 by the executor 105E (act 309). The database statement 158 may be executed causing the management or modification of the local relational database 156. The statement processor may be part of an application 191C, part of the web browser 104, part of a computer program, or a stand-alone computer program.

In one embodiment, the web server 153 may send to the computer system 101 a set of computer instructions that are added to the statement processor 105. The computer instructions may be contained in the web page 157. In one embodiment, the statement processor 105 may be part of the application 191C.

Embodiments of the invention can prevent a malicious server from accessing another server's locally stored database data. For example, it may be that malicious server 163 in domain 161 sends response that includes code (scripts) that request access to database data stored in local store 108 (e.g., through execution of a script). As such, local store access module 107 can compare domain name 162 (the domain name for domain 161) to stored domain names in local store 108 (e.g., domain name 152). If domain name 162 lacks sufficient similarity to any stored domain name, no access to stored database data is given. Thus, database data from other domains, such as, for example, database portion 154P, is protected from unauthorized access. That is, when domain name 152 and domain name 162 lack sufficiently similarity, local store access module 107 does not permit requests from domain 161 to access database portion 154P sent from domain 151 and stored in local store 108

A response from a Web server can include code (scripts) from the server, such as, for example, when a user specifically communicates with a Web site. A response can also include code (scripts) from 3rd party servers, such as, for example, when one Web site includes advertisements for another Web site.

A "malicious" Web server can be viewed as malicious from the perspective of data stored in local store 108, even when a user has legitimate reason to access a Web server. For example, a user may have bank accounts at both a first bank and a second bank. Thus, a user of computer system 101 has a legitimate (and in fact beneficial) reason to access Web sites for both the first and second banks. Further, through prior communication with the first bank's Web site, the first bank may have database data (e.g., a users account information) stored in local store 108. However, the user does not necessarily desire to give the second bank access to the first bank's locally stored database data. The domain name check can prevent scripts from the second bank from accessing the first bank's locally stored database data.

Accordingly, embodiments of the present invention can be used to "sandbox" locally stored Web-based database data per domain.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for storing database data at a computer system for subsequent Web browser access in a relational database in a controlled access store such that the relational database may be modified according to database statements generated by a statement generator on a web server, the method comprising:

wherein the method is performed by a computer server including a Web server, an application, content, a database, and a statement generator;

the statement generator being part of the web server, part of an application, or a stand-alone application;

the computer server connected over a network to the computer system that includes a web browser, a browser cache, a local store access module, the controlled access local store, and the relational database in the controlled access local store;

the Web browser being used for browsing Web-based content;

the contents of the browser cache being fully accessible to any Web server in communication with the Web browser;

the local store access module controlling access to contents of the controlled access local store based on domains associated with Web server requests to access the contents of the controlled access local store, the controlled access limiting further access to each portion of content in the local access store to requests from the domain that initially sent the portion of content for storage in the controlled access local store;

the method further comprising:

receiving a Web based request sent from the computer system to a Web server in a specified domain, the Web based request requesting access to a Web page that includes a portion of a database and other content, the database portion stored in a database accessible to the Web server;

sending the requested Web page from the Web server to the computer system, the Web page including the database portion and the other content;

wherein a web browser in the computer system caches the other content in the browser cache;

wherein the computer system stores the database portion in a relational database in the controlled access local store such that data contained in the stored database portion can be locally provided to the Web browser without the data being included in network based communication;

wherein the computer system retains an indication that the database portion was received from the specified domain so that the local store access module can limit access to the database portion stored in the controlled access local store, the limited access including:

permitting requests from Web servers in the specified domain to access the database portion for use in Web pages presented at the Web browser;

and preventing requests from Web servers in other domains from accessing the database portion;

wherein the web server may modify the relational database in the controlled access local store in the computer system by:

generating a database statement from the statement generator on the web server, wherein the statement generator generates the database statement by reading data from a file or by executing computer code;

wherein the database statement is configured for modification of the relational database;

wherein the database statement is contained in a web page on the web server;

sending the web page from the web server to the computer system;

wherein the database statement is processed by a statement processor in the computer system;

wherein the database statement is executed on the relational database causing modification of the relational database;

wherein the web server may send to the computer system a set of computer instructions in the web page that are added to the statement processor;

wherein the computer instructions are incorporated internally in the statement processor and not presented or displayed to a user.

2. The method of claim 1, wherein the database statement is expressed in SQL.

3. The method of claim 1, wherein the statement processor includes a parser.

4. The method of claim 1, wherein the statement processor includes a rewriter that rewrites a database statement to be more efficient, the rewriter accessing and modifying only the contents of the database statement and not accessing or modifying any relational database.

5. The method of claim 1, wherein the statement processor includes an optimizer that optimizes execution of a database statement, the optimizer accessing and modifying only the contents of the database statement and not accessing or modifying any relational database.

6. The method of claim 1, wherein the statement processor includes an executor.

* * * * *